United States Patent
Di Cairano-Gilfedder

(10) Patent No.: US 12,072,697 B2
(45) Date of Patent: Aug. 27, 2024

(54) AUTOMATED DEVICE MAINTENANCE

(71) Applicant: BRITISH TELECOMMUNICATIONS PUBLIC LIMITED COMPANY, London (GB)

(72) Inventor: Carla Di Cairano-Gilfedder, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 352 days.

(21) Appl. No.: 17/593,644

(22) PCT Filed: Mar. 18, 2020

(86) PCT No.: PCT/EP2020/057530
§ 371 (c)(1),
(2) Date: Sep. 22, 2021

(87) PCT Pub. No.: WO2020/193330
PCT Pub. Date: Oct. 1, 2020

(65) Prior Publication Data
US 2022/0171380 A1    Jun. 2, 2022

(30) Foreign Application Priority Data

Mar. 23, 2019 (EP) .................................. 19164782

(51) Int. Cl.
*G05B 23/02* (2006.01)
*G06N 3/08* (2023.01)

(52) U.S. Cl.
CPC .......... *G05B 23/0283* (2013.01); *G06N 3/08* (2013.01)

(58) Field of Classification Search
CPC .. G05B 23/024; G05B 23/0283; G06N 3/044; G06N 3/08; G06Q 10/20
See application file for complete search history.

(56) References Cited

U.S. PATENT DOCUMENTS

2002/0091972 A1* 7/2002 Harris ............... G07F 19/20
                                                                        714/E11.02
2010/0023307 A1* 1/2010 Lee ............... G06F 18/2321
                                                                        703/7
(Continued)

FOREIGN PATENT DOCUMENTS

EP       3 321 756      5/2018
WO    2016/144586    9/2016

OTHER PUBLICATIONS

Yana Ageeva, Predictive Maintenance Scheduling with AI and Decision Optimization, Jun. 17, 2018, Towards Data Science, Page (Year: 2018).*

(Continued)

*Primary Examiner* — Kidest Bahta
(74) *Attorney, Agent, or Firm* — Nixon & Vanderhye P.C.

(57) ABSTRACT

A computer implemented method of scheduling maintenance tasks for a target device, the device having a unique device type, comprising: retrieving, from a sequential transactional database, a series of transactions for each of a plurality of devices having the device type, each transaction corresponding to a change of state of one of the other devices; training a recurrent neural network based on each retrieved series of transactions as a predictor of a subsequent change of state of a device having the device type; retrieving, from a sequential transactional database, a series of transactions for the target device, each transaction corresponding to a change of state of the device; predicting a next maintenance task for the target device based on the series of transactions for the target device applied to the recurrent neural network; scheduling the predicted next maintenance task for the target device.

9 Claims, 2 Drawing Sheets

(56) References Cited

U.S. PATENT DOCUMENTS

| | | | |
|---|---|---|---|
| 2014/0288992 A1* | 9/2014 | Wetzer | G06Q 10/08 |
| | | | 705/7.23 |
| 2017/0031329 A1* | 2/2017 | Inagaki | G06N 3/08 |
| 2017/0091615 A1 | 3/2017 | Liu et al. | |
| 2018/0121793 A1 | 5/2018 | Bhandary | |
| 2019/0018399 A1 | 1/2019 | Shah et al. | |
| 2019/0178680 A1* | 6/2019 | Kriss | G06Q 10/08 |

OTHER PUBLICATIONS

International Search Report and Written Opinion of the ISA for PCT/EP2020/057530, mailed May 26, 2020, 12 pages.

Combined Search & Exam Report for GB1904024.5, dated Aug. 21, 2019, 6 pages.

Aggarwal et al., "Two Birds with One Network: Unifying Failure Event Prediction and Time-to-failure Modeling", 2018 IEEE International Conference on Big Data (Big Data), IEEE, Dec. 10, 2018 (Dec. 10, 2018), pp. 1308-1317, XP033508398.

Dong et al., "Life prediction of jet engines based on LSTMrecurrent neural networks", 2017 Prognostics snd System Health Management Conference, IEEE, Jul. 9, 2017, pp. 1-6, XP033233599, pp. 1, 1-5 herewith mapped to pp. 1-6.

Search Report for EP19164782.5 dated Sep. 18, 2019, 10 pages.

Oguz et al., "Reconstructing secondary test database from PHM08 challenge data set", Data in Brief, vol. 21, Nov. 20, 2018 (Nov. 20, 2018), pp. 2464-2469, XP055619282.

International Preliminary Report on Patentability for PCT/EP2020/057530 dated Oct. 7, 2021 (8 pages).

* cited by examiner

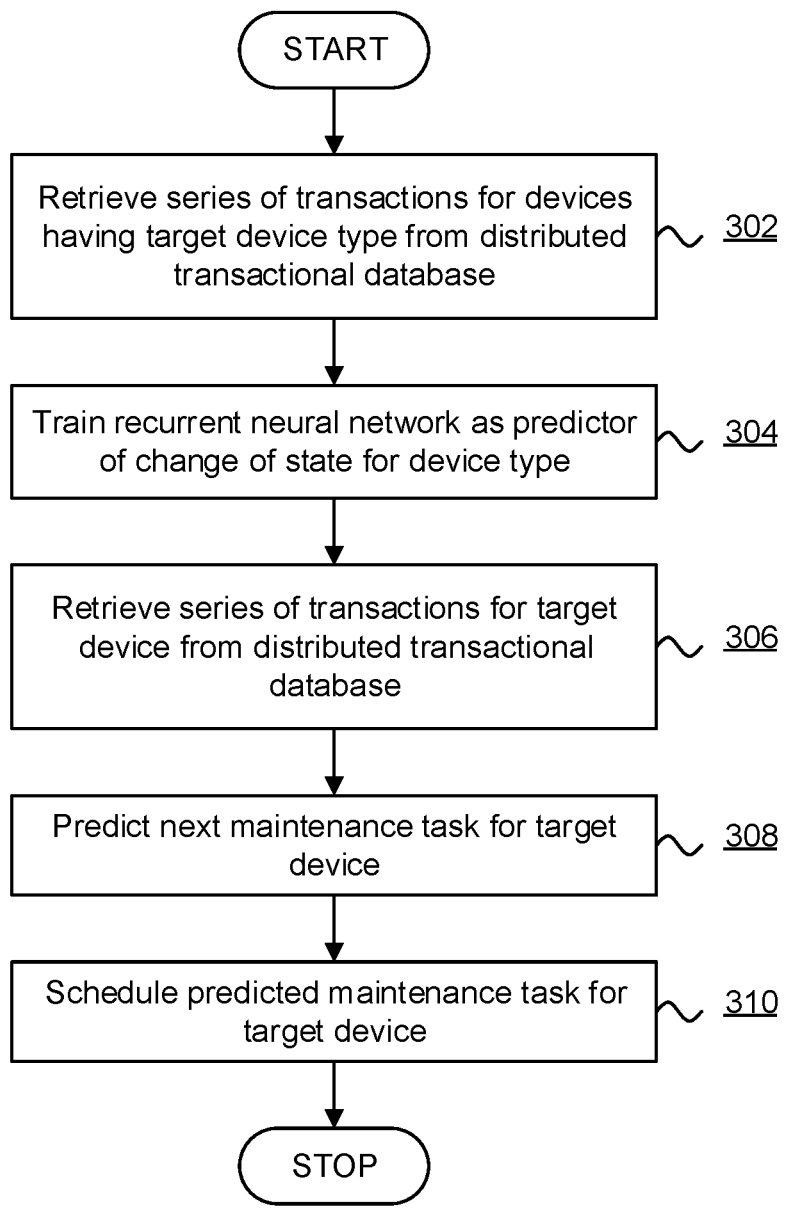

US 12,072,697 B2

AUTOMATED DEVICE MAINTENANCE

This application is the U.S. national phase of International Application No. PCT/EP2020/057530 filed 18 Mar. 2020, which designated the U.S. and claims priority to EP Patent Application No. 19164782.5 filed 23 Mar. 2019, the entire contents of each of which are hereby incorporated by reference.

The present invention relates to automated device maintenance. In particular it relates to automated scheduling of device maintenance tasks.

BACKGROUND AND SUMMARY

Maintenance of devices such as equipment, vehicles, robots, computer systems, appliances and the like can occur according to a predetermined schedule with the aim of detecting and anticipating potential faults or maintenance requirements in advance. Such an approach to maintenance scheduling is prone to mis-scheduling or failure to react to typical, common or usual maintenance requirements occurring outside the predetermined schedule. All unexpected, unplanned and/or unforeseen maintenance of devices has a potential to introduce an interruption to device availability and service, leading to a consequent negative effect on service level, availability and cost.

Thus, there is a challenge in providing an effective approach to scheduling maintenance actions for devices that addresses the aforementioned disadvantages.

According to a first aspect of the present invention, there is provided a computer implemented method of scheduling maintenance tasks for a target device, the device having a unique device type, comprising: retrieving, from a sequential transactional database, a series of transactions for each of a plurality of devices having the device type, each transaction corresponding to a change of state of one of the other devices; training a recurrent neural network based on each retrieved series of transactions as a predictor of a subsequent change of state of a device having the device type; retrieving, from a sequential transactional database, a series of transactions for the target device, each transaction corresponding to a change of state of the device; predicting a next maintenance task for the target device based on the series of transactions for the target device applied to the recurrent neural network; scheduling the predicted next maintenance task for the target device.

Preferably, each change of state includes one or more of: an action of the device; a behaviour of the device; an intervention with the device; an indication of a successful action of the device; an indication of a failed action of the device; and a maintenance event in respect of the device.

Preferably, the recurrent neural network is a long short-term memory (LSTM).

Preferably, training the recurrent neural network includes encoding at least a portion of each series of transactions for each device having the device type as a vector representation for input to the recurrent neural network.

Preferably, predicting the next maintenance task for the target device includes determining a plurality of predictions of subsequent state changes for the target device until a maintenance task state change is detected.

According to a second aspect of the present invention, there is provided a computer system including a processor and memory storing computer program code for performing the steps of the method set out above.

According to a third aspect of the present invention, there is provided a computer system including a processor and memory storing computer program code for performing the steps of the method set out above.

BRIEF DESCRIPTION OF THE DRAWINGS

Embodiments of the present invention will now be described, by way of example only, with reference to the accompanying drawings, in which:

FIG. 3 is a flowchart of a method of scheduling maintenance tasks for a target device in accordance with embodiments of the present invention.

DETAILED DESCRIPTION OF PRESENT EXAMPLE EMBODIMENTS

Figure 1:
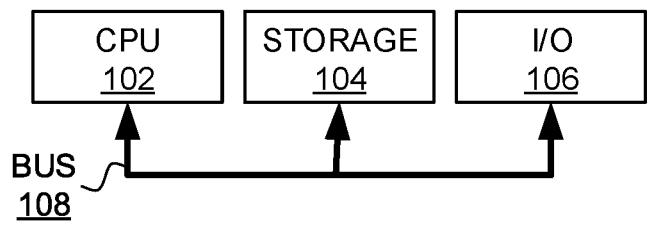
FIG. 1 is a block diagram a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
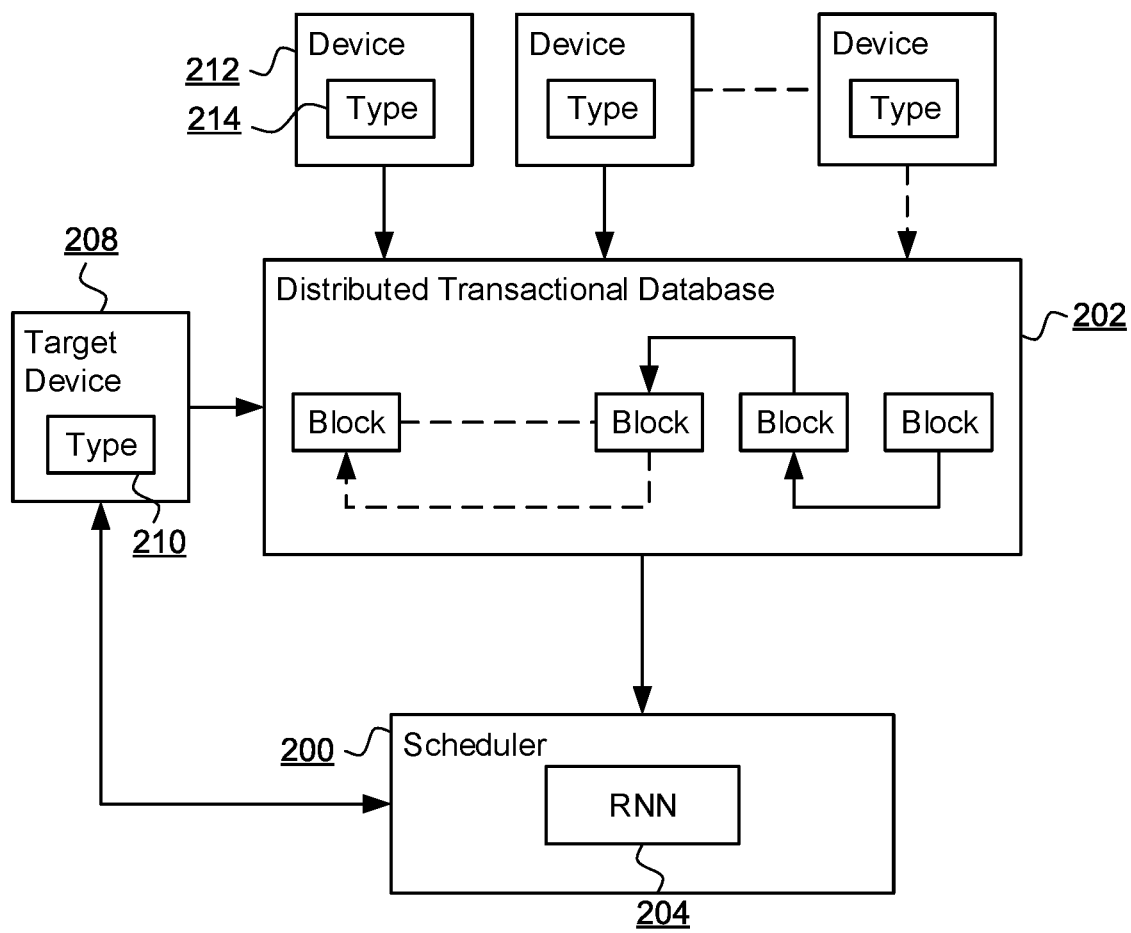
FIG. 2 is a component diagram of an arrangement for scheduling maintenance tasks for a target device according to embodiments of the present invention.

FIG. 2 is a component diagram of an arrangement for scheduling maintenance tasks for a target device 208 according to embodiments of the present invention. The target device 208 can be any suitable device for which state changes occur and maintenance tasks are required. For example, the target device can include a piece of equipment, a vehicle, a robot, a computer system, an electronic component, a computing component, an appliance, a networking device, a telecommunications device or other device as will be apparent to those skilled in the art. The target device has associated a device type 210 as an indication, identifier or reference to a unique category, class or subset of the device. For example, the type 210 could identify a model, version, series or category of device. The type 210 can be selected on a fine or coarse granularity in dependence of the nature of the device 208. For example, where the target device 208 is a networking device the device type 210 can identify the type of appliance such as router, switch, modem or the like. Additionally or alternatively, the device type 210 can identify a particular model of device such as a router of a particular manufacturer, or a particular model identifier for a router. The device type 210 is used as a basis for predictions of maintenance actions for the target device based on other devices of the same type, so device types are preferably selected based on categories or classes of device that are expected to exhibit similar state changes or maintenance actions.

The target device 208 experiences changes of state as it operates. State changes can arise through normal operation of the device 208, through reactions of the device 208 to is operation, through age of the device 208 or through external influences on the device 208. Examples of state change for the device 208 include, one or more of, inter alia: an action of the device; a behaviour of the device; an intervention with the device such as by another device, an operator or a physical environment; an indication of a successful action of the device; an indication of a failed action of the device; and a maintenance event in respect of the device. A transaction is recorded to a sequential transactional database 202 for at least a subset of state changes of the device 208. Preferably, all state changes are recorded to the database 202. The transactions may be recorded by the device 208 directly, or by another device or agent operable to monitor, observe, detect or respond to changes of state of the device 208.

In a preferred embodiment, the sequential transactional database 202 is a blockchain database as a data structure storing one or more blocks and having a state determined by a most recently committed block in the blockchain. The sequential transactional database 202 may be distributed and shared by multiple entities such as physical and/or virtualised computer systems communicating via one or more suitable communications networks. Sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a database is herein referred to as a sequential transactional database 202 though it will be appreciated that other suitable databases, data structures or mechanisms possessing the characteristics essential for embodiments of the present invention could alternatively be used. Typically, a sequential transactional database is a distributed chain of block data structures accessed by a network of nodes, often referred to as a network of miners. Each block in a sequential transactional database includes a one or more data structures, and in some exemplary databases a Merkle tree of hash or digest values for transactions included in a block are used to arrive at a hash value for a block which is itself combined with a hash value for a preceding block to generate a chain of blocks (i.e. a blockchain). A new block of one or more transactions is added to the database by such miner software, hardware, firmware or combination systems in, for example, a miner network. A newly added block constitutes a current state of the database. Such miners undertake validation of substantive content of transactions (such as any criteria defined therein) and adds a block of one or more new transactions to a database as a new state of the database when a challenge is satisfied as a "proof-of-work", typically such challenge involving a combination hash or digest for a prospective new block and a preceding block in the blockchain and some challenge criterion. Thus, miners in a miner network may each generate prospective new blocks for addition to the sequential transactional database. Where a miner satisfies or solves a challenge and validates the transactions in a prospective new block such new block is added to the database. Accordingly, a sequential transactional database provides a distributed mechanism for reliably recording series' of transactions corresponding changes of state of devices such as the target device 208.

A plurality of other devices 212 are also provided, each of which including a device type 214. Notably, the other devices can include devices having the same device type as the target device. Each of the other devices operates in a manner similar to that described above with respect to the target device 208 including changes of state and storing transactions to the sequential transactional database 202 for such changes.

Embodiments of the present invention include a scheduler component 200 as a hardware, software, firmware or combination component arranged to schedule maintenance tasks for the target device 208. The schedule component includes a machine learning component as a recurrent neural network 204. Recurrent neural networks are known in the art and can be used to analyse sequential data due to their ability to take multiple inputs one after the other and save state information between inputs. In this way, the recurrent neural network 204 is suitable for, when trained, generating a prediction of a subsequent state based on a series of preceding states. For example, the recurrent neural network 204 can be provided as a long short-term memory (LSTM) as known in the art.

In use, the scheduler 200 retrieves a series of transactions from the database 202 for devices 212 having the same or a compatible type indication 214 as the target device type 210. The transactions are retrieved in a chronological order to provide a series of transactions for each such device 212. Each transaction in such series thus corresponds to a change of state of a device 212 having the same or compatible type 214 as the target device 208. The scheduler 200 trains the recurrent neural network 204 based on each retrieved series of transactions to provide a predictor of a change of state of a device by way of the trained recurrent neural network 204.

In a preferred embodiment, a series of transactions for a device 212 is encoded as a vector representation suitable for training the recurrent neural network 204. For example, at least a portion of transactions (and preferably all transactions) in the series are used to encode elements in a vector representation such that the vector representation constitutes a representation of the chronological series of transactions suitable for training the network 204.

Subsequently, the scheduler 200 retrieves a series of transactions from the database 202 for the target device 208, each transaction corresponding to a change of state of the target device. The transactions for the target device are applied to the recurrent neural network 204 as input to generate a prediction of a next change of state of the target device 208. In a preferred embodiment, the series of transactions for the target device 208 is encoded as a vector representation suitable as input to the recurrent neural network 204.

Thus, where the recurrent neural network 204 predicts a next state change of the target device 208 is a state change involving a maintenance action, then the schedule 200 is operable to schedule such predicted maintenance action as a maintenance task for the target device 208.

In one embodiment, where the next state change of the target device 208 is not a maintenance action the scheduler 200 iterates predictions of the recurrent neural network 204 for the target device 208 such that each new prediction is added to the series of state changes for the target device 208 generate a next new prediction until a predicted state change involving a maintenance action is identified or some other suitable stopping condition is reached (such as a time limit, volume of predictions limit or similar). Thus, in this way, the scheduler 200 is operable to predict a number of state changes until a next maintenance action for the target device 208 as a basis for scheduling such maintenance action for the target device 208. Such a prediction can be used to inform planning, resourcing or load balancing activities of a plurality of devices including the target device 208 so as to reduce an impact of maintenance of the target device on an overall system of tasks. Additionally or alternatively, such a prediction can be used to predict a future potential change of state indicative of a prospective failure of the target device to complete a task and to schedule a maintenance action in advance of such predicted failure to mitigate or avoid the failure.

FIG. 3 is a flowchart of a method of scheduling maintenance tasks for a target device in accordance with embodiments of the present invention. Initially, at step 302, the scheduler 200 retrieves a series of transactions for each of a plurality of devices 212 having the device type of the target device 210 from the sequential transactional database. At step 304 the scheduler 200 trains the recurrent neural network 204 based on each retrieved series of transactions as a predictor of a subsequent change of state of the target device 208. At step 306 the scheduler 200 retrieves a series of transactions for the target device 208 from a sequential transactional database. At step 308, the scheduler 200 generates a prediction of a a next maintenance task for the target device 208 based on applying the series of transactions corresponding to a series of state changes of the target device 208 to the recurrent neural network 204. Subsequently, at step 310, the scheduler 200 schedules the predicted next maintenance task for the target device 208 responsive to step 308.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A computer implemented method, using a non-transitory computer-readable storage medium, of scheduling maintenance tasks for a target device, the device having a device type, comprising:
   retrieving, from a sequential transactional database, a series of transactions for each of a plurality of devices having the device type, each transaction corresponding to a change of state of one of the other devices;
   training a recurrent neural network based on each retrieved series of transactions as a predictor of a subsequent change of state of a device having the device type;
   retrieving, from the sequential transactional database, a series of transactions for the target device, each transaction corresponding to a change of state of the device;
   predicting a next maintenance task for the target device based on the series of transactions for the target device applied to the recurrent neural network; and
   scheduling the predicted next maintenance task for the target device; wherein:
   the sequential transactional database is a blockchain database; and
   predicting the next maintenance task for the target device includes determining a plurality of predictions of subsequent state changes for the target device until a maintenance task state change is detected.

2. The method of claim 1 wherein each change of state includes one or more of: an action of the device; a behaviour of the device; an intervention with the device; an indication of a successful action of the device; an indication of a failed action of the device; or a maintenance event in respect of the device.

3. The method of claim 1 wherein the recurrent neural network is a long short-term memory (LSTM).

4. The method of claim 1 wherein training the recurrent neural network includes encoding at least a portion of each series of transactions for each device having the device type as a vector representation for input to the recurrent neural network.

5. A computer system including a processor and non-transitory memory storing computer program code which upon execution by the processor perform scheduling of maintenance tasks for a target device, the device having a device type, such that the computer system is at least configured to:
   retrieve, from a sequential transactional database, a series of transactions for each of a plurality of devices having the device type, each transaction corresponding to a change of state of one of the other devices;
   train a recurrent neural network based on each retrieved series of transactions as a predictor of a subsequent change of state of a device having the device type;
   retrieve, from the sequential transactional database, a series of transactions for the target device, each transaction corresponding to a change of state of the device;
   predict a next maintenance task for the target device based on the series of transactions for the target device applied to the recurrent neural network; and
   schedule the predicted next maintenance task for the target device; wherein:
   the sequential transactional database is a blockchain database; and
   the prediction of the next maintenance task for the target device includes a determination of a plurality of predictions of subsequent state changes for the target device until a maintenance task state change is detected.

6. A non-transitory computer-readable storage medium storing computer program code to, when loaded into a computer system and executed thereon, cause the computer system to perform steps of a computer implemented method of scheduling maintenance task for a target device, the device having a device type, the method comprising:
   retrieving, from a sequential transactional database, a series of transactions for each of a plurality of devices having the type, each transaction corresponding to a change of state of one of the other devices;

training a recurrent neural network based on each retrieved series of transactions as a predictor of a subsequent change of state of a device having the device type;

retrieving, from the sequential transactional database, a series of transactions for the target device, each transaction corresponding to a change of state of the device;

predicting a next maintenance task for the target device based on the series of transactions for the target device applied to the recurrent neural network; and scheduling the predicted next maintenance task for the target device; wherein:

the sequential transactional database is a blockchain database; and predicting the next maintenance task for the target device includes determining a plurality of predictions of subsequent state changes for the target device until a maintenance task state change is detected.

7. The computer system of claim 5 wherein each change of state includes one or more of: an action of the device; a behaviour of the device; an intervention with the device; an indication of a successful action of the device; an indication of a failed action of the device; or a maintenance event in respect of the device.

8. The computer system of claim 5 wherein the recurrent neural network is a long short-term memory (LSTM).

9. The computer system of claim 5 wherein the training of the recurrent neural network includes encoding at least a portion of each series of transactions for each device having the device type as a vector representation for input to the recurrent neural network.

* * * * *